United States Patent [19]

Weber

[11] 4,191,860
[45] Mar. 4, 1980

[54] DATA BASE COMMUNICATION CALL PROCESSING METHOD

[75] Inventor: Roy P. Weber, Bridgewater, N.J.

[73] Assignee: Bell Telephone Laboratories, Incorporated, Murray Hill, N.J.

[21] Appl. No.: 924,170

[22] Filed: Jul. 13, 1978

[51] Int. Cl.² ........................ H04M 3/42; H04M 7/06
[52] U.S. Cl. .............................. 179/18 B; 179/18 EA
[58] Field of Search ........... 179/18 B, 18 BA, 18 EA, 179/18 DA

[56] References Cited

U.S. PATENT DOCUMENTS

| 3,189,687 | 6/1965 | Miller | 179/18 DA |
| 3,692,946 | 9/1972 | Budrys et al. | 179/18 BA |
| 3,975,595 | 8/1976 | Berube et al. | 179/18 BA |

Primary Examiner—Thomas W. Brown
Attorney, Agent, or Firm—Fredrick W. Padden

[57] ABSTRACT

A method is disclosed for processing call data among telephone switching offices and a remotely situated data base system for deriving call service information needed to complete special service calls, such as INward WATS (Wide Area Telephone Service) calls to a destination specified by the derived information. A network of local and toll offices compiles a special service call message including a caller dialed 800 number and an originating area code for the INWATS service and then transmits that message to the data base system over CCIS (Common Channel Interoffice Signalling) facilities including signal transfer systems. At the data base, the message is translated into a directory-unlisted number identifying an INWATS customer station designated to serve the call. Before the call is switched through the toll switching network under control of the unlisted number, the open/closed and busy/idle conditions of the INWATS station are checked at the data base to determine the availability of the station to serve the call. Traffic data is accumulated at the data base by originating area code and by the unlisted INWATS number. When the number of calls to the unlisted number per unit time exceeds a threshold, the data base instructs the telephone system to inhibit such calls from being served for a prescribed period.

23 Claims, 5 Drawing Figures

TELEPHONE - DATA BASE SYSTEM FOR INWATS USING CCIS

FIG. 1

TELEPHONE - DATA BASE SYSTEM FOR INWATS USING CCIS

FIG. 2

ORIGINATING AREA CODE TO POTS NUMBER TRANSLATOR TABLE (20)

| AREA CODE | POTS # | COUNTER |
|---|---|---|
| 201 | 212-525-3333 | 100 |
| 208 | NONE (NULL ENTRY) | --- |
| 609 | 212-525-3333 | 50 |
| 805 | 919-658-3399 | 10 |
| 808 | 206-582-2044 | 5 |
| 919 | 919-658-3390 | 5 |

FILE 28 · · · · 27

FIG. 3

POTS NUMBER CALL PROCESSING DATA TABLE (21)

| POTS # DDD # | LOOP BIT | CLOSED TIME TIMES, DAYS | BUSY/IDLE BIT | ALTERNATE POTS# DDD# | NETWORK MANAGEMENT ||||
|---|---|---|---|---|---|---|---|---|
| | | | | | COUNTER | THRESHOLD | ON/OFF | INHIBIT TIME (SEC) |
| 206-582-2044 | 0 | NONE | 0 | 212-525-3333 | 51 | 100 | 0 | 0 |
| 212-525-3333 | 0 | NONE | 0 | NONE | 150 | 90 | 1 | 6 SEC |
| 919-658-3399 | 0 | 5 PM - 9 AM, ALL SUN | 0 | 206-582-2044 | 10 | 125 | 0 | 0 |

FILE 29, FILE 32, FILE 23 — 49, 24, 25, 26, 46, 47, 50, 48

DATA BASE COMMUNICATION CALL PROCESSING METHOD

TECHNICAL FIELD

This invention relates to communication call routing and particularly to a method for automatically processing telephone call data from a telephone system over CCIS (Common Channel Interoffice Signaling) direct signaling facilities to a remote data base for translation into a call control message which is then sent to the telephone system for controlling the further completion of call connections to a destination in accordance with the control message.

The invention specifically pertains to procedures for processing an INward WATS (Wide Area Telephone Service) call over the CCIS facilities to a data base system for obtaining the number of an available station to which the call is to be completed.

BACKGROUND ART

INward WATS is popularly known as INWATS and is frequently referred to as the "800" number toll-free telephone service. It allows a customer to establish an area of the country from which he can receive calls without charge to the calling parties. In the United States, the service is currently available for both intrastate and interstate calls. Tariff costs for the service are based on the number of customer lines, the band of rate states selected, the total monthly hours of usage, and the total number of calls completed.

Over the last decade, the volume of INWATS calls has increased to the extent that INWATS traffic has become a substantial percentage of all toll calls served by existing telephone switching systems. The service has proven to be especially useful for business customers in obtaining travel and hotel reservations, purchase orders, and the like.

Despite the commercial success of INWATS, the ever expanding customer demands for the service and the projected extension of INWATS for international calling has presented a number of problems for the telephone industry and its customers. Prevalent among the problems are: (1) the rigid geographic bands for INWATS, (2) the requirement for a multiplicity of INWATS numbers, (3) routing and numbering inefficiencies due to service entitlement check operations of originating and terminating screening offices, (4) ineffective attempts due to all INWATS customer lines busy conditions caused, for example, by mass calling to 800 numbers advertised, for example, on television, and (5) the absence of traffic statistics for INWATS customers on the number of calls made from each area code.

To elaborate, in the United States, a customer purchases the service on intrastate and/or interstate bases and is supplied with one or more INWATS numbers. Such an arrangement is necessary because of state and federal tariffs. Interstate INWATS is currently offered for a maximum of seven geographic bands. Band 1 generally involves all states bordering the customer home state; Band 2 typically includes all of Band 1 and additional states bordering Band 1; Band 5 presently covers the continental United States; Band 6 adds Hawaii and Alaska; and Band 7 includes Puerto Rico and the Virgin Islands. In some cases, multiple bands of intrastate service are also offered. Customers purchase the various service bands on a 240 hours/month or a 10 hours/month basis.

The rigid band assignment heretofore has required a customer to purchase an entire band encompassing many different telephone area codes even though the customer may desire INWATS service only in a portion of that band. A need has therefore existed for a procedure and equipment which fulfills customer requests for INWATS service covering only desired telephone area codes.

A principal INWATS problem has been the necessity for the purchaser in many instances to be assigned a multitude of different INWATS numbers. Illustratively, several airline reservation services with multiple regionalized answering points presently are provided with between 10 and 20 different INWATS numbers to obtain reasonably economical INWATS service throughout the United States. The different numbers are required by the customer because of geographical location, business hours and the designs and operations of existing switching equipment. Such multiple number requirements have proven to result in customer and user confusion, errors in directory number listings and advertising, as well as complications in obtaining directory assistance for nonlocally published INWATS numbers and in conformity with the call originating area codes. New call processing techniques and facilities are therefore needed to eliminate the plural numbers for each INWATS customer.

An INWATS number presently includes a special area code of 800, followed by a specific NNX code for the terminating NPA (Number Plan Area), followed by a four digit number XXXX. "N" in the code refers to any digit except 0 or 1 and "X" refers to any one of 10 digits. Of the NNX codes, all NN2 codes are currently reserved for intrastate use. At the present time, each NPA in the United States is assigned one NNX code with the exception of the NPAs 212, 312 and 213 each of which have two NNX codes.

INWATS number usage is readily understood by considering an example of a typical INWATS call. Assume that a party in Indianapolis wishes to place a call to an INWATS customer with the assigned number 800+241+2312 in the Atlanta, Georgia area. After the caller dials the number, the call is routed to an originating screening office which utilizes the 800+241 to determine both the terminating city (Atlanta) and the band of the calling party with respect to the terminating city. The screening office then sends a number 142+2312 to a terminating screening office for Atlanta. The underlined "2" indicates that Indianapolis is in Band 2 with respect to Atlanta and the "4" represents the 241 NXX code. On the basis of the received 142+2312, the terminating screening office ascertains whether or not the call originated from a permissible rate band purchased by the called custmer. If the call is entitled to be completed, the terminating screening office controls the establishment of call connections to the called customer.

A disadvantage of the foregoing INWATS call processing arrangements is that INWATS call screening, routing and service entitlement checking functions are performed by costly, complex and special INWATS facilities integrated into many individual originating and terminating screening offices throughout the nation and without call rerouting capability in such offices in the event of call overload or equipment failure. Another disadvantage is that no procedure is available for determining the busy condition of INWATS customer lines before calls are switched through the toll network. Present day switching systems determine that all INWATS customer lines are busy only after the calls are routed through the originating and terminating screening offices to the local terminating office. As a consequence, the telephone network occasionally is overloaded, particularly during heavy traffic periods by mass calling to the all busy INWATS customer lines. Such overloads obviously are undesirable and prove to be a problem for telephone companies especially because no facilities are available for dynamically identifying INWATS customer busy conditions and then precluding the toll switching of INWATS calls to that customer.

Another disadvantage is that existing telephone systems and call processing techniques have been unable to provide adequate traffic data to INWATS customers on the number of calls received from a given geographic area. The data would aid in the determination of the numbers of INWATS lines and stations as well as the personnel needed to serve the calls. It would also enable customers to determine whether the serivce is economically warranted for that area.

DISCLOSURE OF THE INVENTION

The foregoing problems are solved and a technical advance is achieved by a call processing method which automatically processes prescribed communication calls from a switching network to a data base system for deriving call service information and then returning the call to the network for completion in response to the information supplied by the data base. In embodiments of the method, the information provided by the data base is either a destination number, such as for a machine message announcement or a station, or a call completion authorization code.

The method is utilized for special service calls, such as INWATS calls, served by a communication system, such as a local or toll originating screening office or a communication customer service system. It involves a process of sending a special service call data including a dialed number and a suffix code from the switching system to a data base system, translating the received message into a call control message at the data base, and returning the control message to the communication system to control the establishment of call connections in accordance with the control message. Advantageously, the control message comprises the routing message including a number identifying either a subsystem, such as a voice storage facility, which supplies machine messages to the caller, or a called party station such as an INWATS customer reservation bureau which furnishes operator services.

For INWATS service, each INWATS customer is assigned a single ten digit "800" number which is dialed by callers on all calls to that customer regardless of their place of origination. The number is used to control the establishment of connections through a telephone switching system to a centralized data base system for deriving all of the call routing, traffic measurement and network management data on calls to the INWATS customer.

The data is utilized to screen calls for INWATS service entitlement and for specifying a directory-unlisted POTS (Plain Old Telephone Service) DDD (Direct Distance Dialing) number to which entitled calls are preferably to be routed to the INWATS customer on a toll-free basis to the caller. Data is included in the data base for specifying the busy/idle status and open/closed station condition of the preferred number. An alternate unlisted number is also stored in the data base for routing calls to that number whenever the preferred number is busy or closed.

The data base is strategically located to serve a multitude of telephone offices and illustratively is one of several designed to serve as call distribution systems for the entire United States. It is advantageously arranged for traffic measurements of calls to the INWATS customer on the basis of originating area code. These measurements enable the customer to analyze traffic patterns and "800" number usage by area code, to obtain adequate numbers of INWATS lines and personnel for serving the calls, and to determine the economic need for the INWATS service in that area. The data base measures the traffic by counting each call by the originating area code and by accumulating a count of all calls to the INWATS customer. When the latter exceeds a predetermined threshold per unit time, the data base manages the number of calls routed to the preferred and/or alternate numbers in such a way as to reduce the probability of ineffective call completion attempts due to mass calling of the INWATS customer. It does so by instructing the telephone system control to inhibit calls to the INWATS number for a prescribed period of time. This action relieves the telephone voice network, data base and CCIS facilities from real time involvement on calls to busy stations and makes them available for serving other calls.

The data base comprises a first table in memory which includes a file of originating area codes (NPAs). Each such code is correlated in the file with an individual POTS number when INWATS service is purchased by the customer for that area code. In response to a receipt of a dialed INWATS number and the call originating area code from a telephone system, the data base examines its NPA file of originating area codes for screening the call to check whether the INWATS customer is entitled to receive calls from that area code on a toll-free basis to the caller. Entitlement is identified by the presence of the POTS number in the same memory file as the received area code. The NPA file also comprises a counter which is incremented on each call attempt per originating area code.

A second memory table includes an individual file for each POTS number that stores busy/idle data and open/closed hours information for that POTS number. The busy/idle data is dynamically loaded under control of the call terminating office signaling the busy and idle status of the line(s), or line group, associated with the POTS number. The data is advantageously used to reduce the probability of ineffective attempts to complete calls to all busy or closed stations and thereby reduces the unnecessary use and tie-up of toll telephone switching equipment. It also serves to signal when the station is idle and therefore available to serve calls.

Each POTS file in the second memory table also includes an alternate, or second choice, POTS number to which an INWATS call is routed when the preferred first choice POTS number is either busy or closed. The file also comprises a counter which is incremented on each call involving the preferred POTS number to accumulate a count of the total number of calls generated. The same file includes threshold and call inhibit time data for managing the number of calls that are directed to the POTS number within a given interval of time.

The procedure for processing an INWATS call comprises a calling party dialing the 800-NXX-XXXX of the desired INWATS customer. The local telephone office serving the calling station is responsive to the dialed number for routing the call to a toll office equipped with CCIS (Common Channel Interoffice Signaling) facilities and sending to that office the dialed number. The toll office routinely identifies the area code from which the call originates and then sends it, as a suffix code, together with the dialed number over the CCIS direct signaling system to the data base identified by the CCIS system from the dialed 800-NXX.

At the data base, the received INWATS number is checked to ascertain that it is an active working number. Next, the file of the originating area code is located in the first memory table and the entitlement of the call to be made from that originating area is verified by extracting the POTS number of the INWATS customer station preferably designated to serve the call. The NPA file counter is then incremented to indicate a call attempt involving the originating area code.

Thereafter, the file of the preferred POTS number is located in the second memory table and the open/closed and busy/idle status of the destination station associated with that number is examined. Upon determining that the station is open and idle, a CCIS message containing the preferred POTS number is sent from the data base over the CCIS system to the toll office for enabling call connections to be established from that office through the toll switching network to the station associated with the POTS number. At about the same time, the counter in the POTS number file is incremented to accumulate data on traffic to that POTS number and to control call routing to it during mass calling periods when the number of calls exceed a predetermined threshold.

Busy and idle data for each INWATS station is dynamically routed from an associated terminating telephone office over CCIS facilities to the data base for updating records in the file of the station POTS number in the second memory table. The busy data controls the processing of INWATS cells selectively to alternate POTS number(s) and to audible busy station messages.

The call processing procedure is arranged to return CCIS messages from the data base to the toll office to identify the dialing of a nonworking INWATS number, a call which is not authorized on a toll-free basis from that call originating area, and the busy or closed status of the INWATS station designated to serve the call.

The method is advantageously useful for data base service on automated collect calling, toll call fowarding and other special service calls as hereinafter described.

Figure 1:
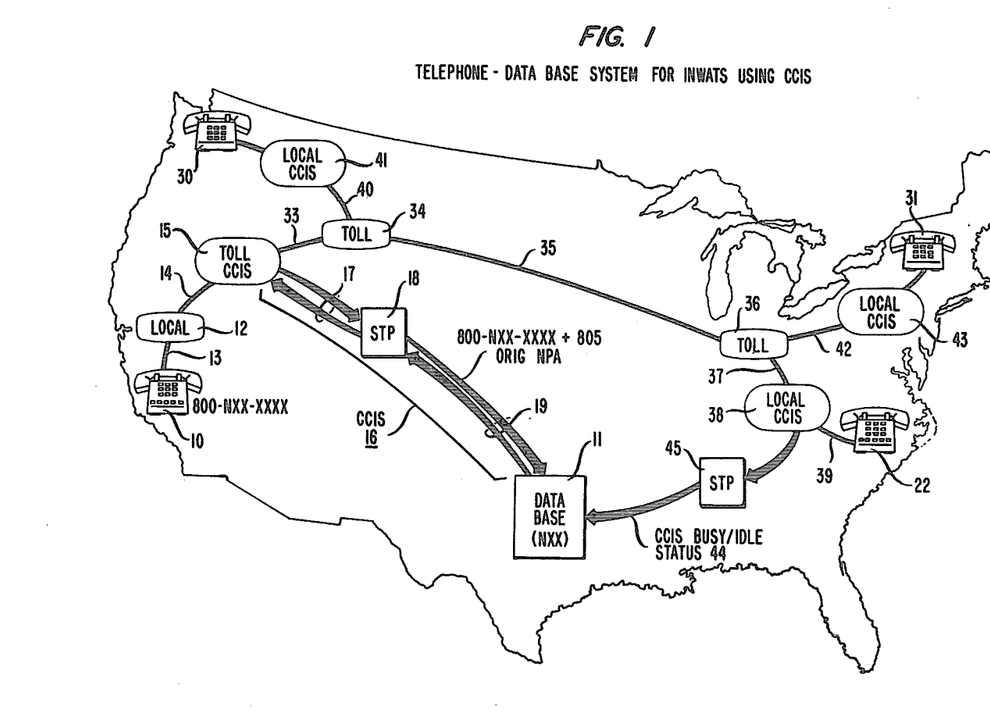
FIG. 1 shows, in block diagram form, a configuration of telephone switching offices, CCIS and signal transfer facilities together with one of several data bases illustratively for serving INWATS calls in the United States.

The drawing illustrates a number of local telephone switching offices, such as offices 12, 38, 41 and 43 which serve associated telephone stations, such as stations 10, 22, 30 and 31. The drawing also discloses toll offices such as offices 15, 34 and 36 which form a toll switching network serving the local offices. The structural details of such local and toll offices form no part of the present invention and are only described herein to the extent necessary for an understanding of this invention. Each of the local offices, by way of example, is suitably an electronic program controlled telephone system of the No. 1 ESS (Electronic Switching System) type disclosed in the *Bell System Technical Journal* (BSTJ), September 1964, Volume XLIII, Number 5, Parts 1 and 2; and in the R. W. Downing-H. F. May-F. F. Taylor-U. Ulrich U.S. Pat. No. 3,570,008 of Mar. 9, 1971. Those disclosures and the citations referred to therein may be consulted for a complete understanding of the construction and operations of a typical local switching office 12, 38, 41 and 43.

Each toll office is illustratively an electronic program controlled telephone system of the No. 4 ESS design with CCIS facilities as disclosed in the *Bell System Technical Journal* (BSTJ), September 1977, Volume 56, No. 7.

CCIS facilities utilized in conjunction with the local and toll offices and the data base system 11 are disclosed in the BSTJ, February 1978, Volume 57, No. 2 and in W. B. Smith-J. B. Synnott, III U.S. Pat. No. 3,624,613 of Nov. 30, 1971.

DETAILED DESCRIPTION

In FIG. 1, the processing of a call to an INWATS customer is explained by assuming that it is originated from a calling station 10 in California. The INWATS customer is assigned a single telephone number which is dialed by callers on all calls to that customer regardless of their place of origination. The number comprises ten digits including an 800 area code portion followed by seven digits NXX-XXXX. The NXX digits identify the data base, such as data base 11 in Texas, which stores the INWATS customer data utilized for processing the call to the appropriate destination. The NXX-XXXX digits identify the INWATS customer within the data base. The "N" digit is any value 2–9 and each of the "X" digits is any value 0–9.

For the exemplary embodiment, call processing is described by assuming that the call may be routed to any one of three destinations, namely, first, second and third choice numbers respectively identifying stations 22, 30 and 31. Each such station is depicted as an individual telephone station for the purpose of illustration. It is to be understood that in many cases INWATS call answering facilities commercially utilize automatic call distributor systems involving numerous groups of incoming telephone lines served by a local or toll telephone switching system. A typical distributor system is disclosed, for example, in S. F. Dunning U.S. Pat. No. 3,111,561 of Nov. 19, 1963. The three destination stations will suffice to explain typical call situations encountering open/closed and busy/idle conditions and the likelihood of completing INWATS calls in geographic areas with different local business hours.

After station 10 initiates a call and dials the INWATS customer number, office 12 recognizes the 800 area code and routes the call illustratively over a trunk 14 to a toll office 15 equipped with CCIS facilities. Office 12 also forwards the dialed INWATS number to office 15 for assembly in office 15 with the area code for that portion of California from which the call originates. Office 15 determines the originating area code based on the serving of the call over trunk 14 in a known manner.

Office 15 routinely translates the dialed 800 digits and determines that the call is to be routed to a data base for deriving call routing data. As a consequence, office 15 formulates an INWATS CCIS message including an identification of the special service call, the office 15 and the originating area code as well as the dialed number and sends that message over the CCIS link 17 to a signal transfer point or system 18. The latter is responsive to the received message for translating the 800-NXX digits to determine that the INWATS customer data is stored in the data base system 11, which illustratively is located in Dallas, Texas. System 18 then forwards the CCIS message to data base 11 over a CCIS link 19. System 18 is essentially a data link, or packet, switching arrangement for CCIS applications. Packet data switching facilities are disclosed for example in A. G. Fraser U.S. Pat. Nos. 3,749,845 of July 31, 1973 and 3,979,733 of Sept. 7, 1976. Structure and operations of CCIS are described, by way of example, in the 57 BSTJ No. 2, page 230, et seq. Thus, the call is processed from the toll telephone switching network to a data base for deriving call service information.

Data base system 11 is, by way of example, a commercially available system, such as a Western Electric Company, Incorporated 1A processor (disclosed in 56 *Bell System Technical Journal* No. 7, February 1977), equipped with disk storage and a system of programs to establish, edit and manage information stored in memory. It is equipped via a peripheral unit bus (disclosed in 57 *Bell System Technical Journal* No. 2 February 1978) with CCIS facilities for interface communication with the signal transfer system 18 and the toll network. System 11 is responsive to the received INWATS number and originating area code for deriving all of the stored information needed for processing the call to an idle and available INWATS customer station designed as the preferred called station to serve the call. The information includes data for the active-inactive status of the dialed INWATS number, the storage files associated with the active number, the inband/out-band character of the call based on the received originating area code, and a directory-unlisted POTS number of a destination subsystem or station.

Figure 2:
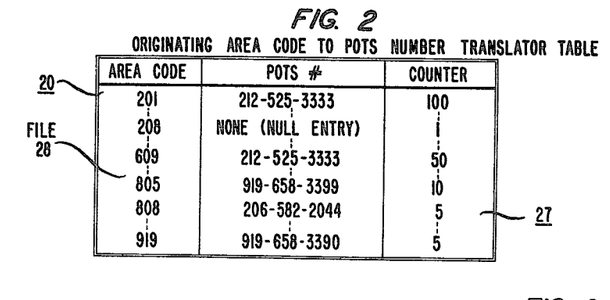
FIG. 2 depicts an area code to POTS number listing of a data base translator and an originating area code call counter.
Figure 3:
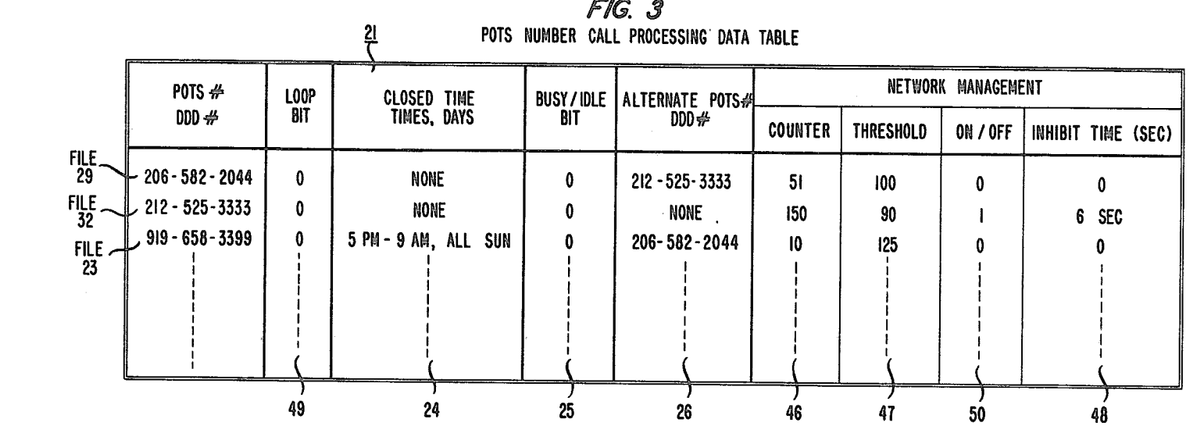
FIG. 3 illustrates the data base translator listing of busy/idle, closing time, loop, alternate route number, and network management data for the POTS number.

For each active INWATS number, data base system 11 is equipped with translator tables 20 and 21 of FIGS. 2 and 3. Table 20 contains a list of originating area codes and a correlated list of POTS DDD (Plain Ordinary Telephone Service Direct Distance Dialing) numbers identifying one or more called stations primarily designated to serve calls from the respective originating areas. Each listed area code is uniquely associated with an individual one of the listed POTS numbers when the INWATS customer is entitled to receive calls from that originating area on a toll-free basis to the calling party. A single such POTS number may be shared by a plurality of different originating area codes. Whenever table 20 contains a POTS number for an originating area code, calls from that area are designated as being "inband". Otherwise, in the absence of a POTS number for the area code, (null entry) calls from that area are "out-of-band" for the INWATS customer and calls are not completed on a toll free basis to the caller.

Illustratively, on the call originating from station 10, the originating area code is 805 and table 20 lists a correlated POTS number 919-658-3399, which is a called station 22 in North Carolina, preferably designated as a first choice to serve the INWATS calls. Accordingly, such a call is "in-band". If it were not, no POTS number would be listed in table 20 for the area code 805.

Each originating area code in table 20 is furnished with a counter 27 which is incremented on each call attempt involving that area code. In this way, statistics are derived on calls by area codes regardless of whether the INWATS customer purchases the serivce for that area.

Figure 5:
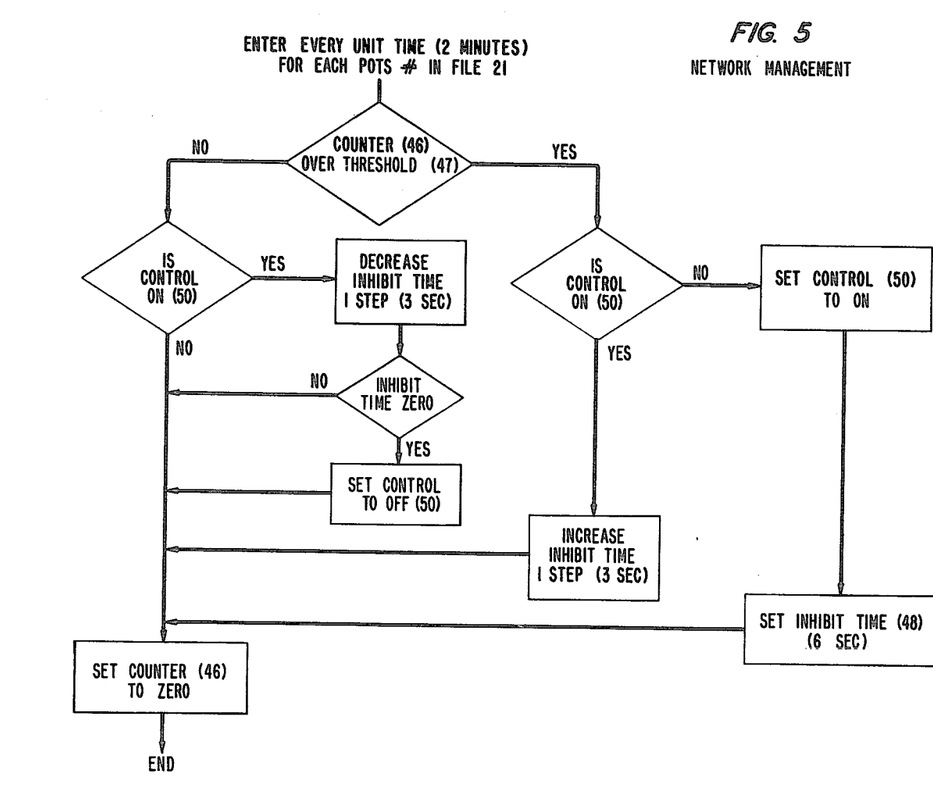
FIG. 5 is a flow chart of network management operations.

Table 21 contains a plurality of files each of which is associated with an individual POTS number in table 20. Each such file, such as file 23, contains eight individual items of data for each such number. These data items are utilized, as appropriate, for completing calls to the associated POTS number and for recording the number of such calls for network management purposes. The first item 49 is a loop bit used to ensure that the alternate routing does not loop on itself. The second item 24 identifies the times and dates on which the station associated with the POTS number 919-658-3399 is closed or personnel is unavailable for serving incoming calls. Closed times are, for example, nonbusiness hours, such as 5 p.m.–9 a.m., holidays, and weekends, such as Sunday. The third item 25 contains a bit indicating the current busy-idle status of the POTS number 919-658-3399. The fourth item 26 contains an alternate POTS DDD number 206-582-2044 which is used when the preferred POTS number is busy, closed or unavailable. The fifth item 46 contains a call counter which accumulates a count of the number of calls made to the POTS number 919-658-3399 for a current time interval, for example, two minutes. The sixth item 47 contains a threshold number for inhibiting calls to the POTS number. The seventh item 50 indicates whether a network management control is currently effective based on the previous time interval. The last item is a time interval 48 specifying the period for inhibiting data base inquiries to the 800+NXX-XXXX. Entry 48 is dynamically updated by a procedure described in FIG. 5.

Figure 4:
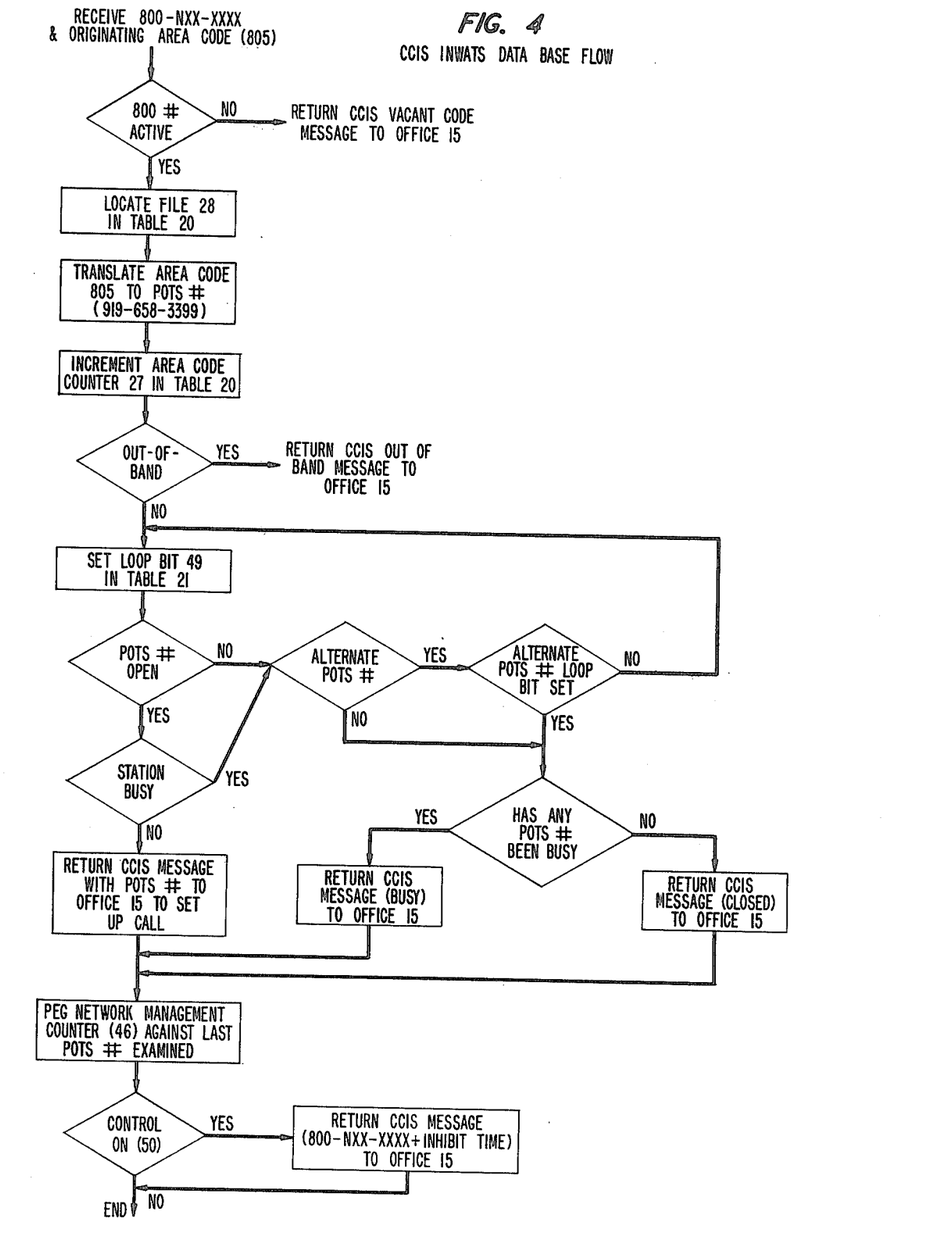
FIG. 4 is a flow chart of data base system operations for an INWATS call.

The utilization of data in tables 20 and 21 and INWATS information processing operations of the data base system 11 are now described for the call from station 10 of FIG. 1 with reference to the flow diagram of FIG. 4. After the tables 20 and 21 are loaded with the data as depicted in FIGS. 2 and 3, system 11 is responsive to the receipt of the CCIS INWATS message for checking its records (not shown) to determine whether the dialed INWATS number is active or inactive. If it is not validly in use and therefore inactive, system 11 effects a return of a CCIS vacant code message to the toll office 15 of FIG. 1 via link 19, signal transfer system 18 and link 17. Office 15 thereupon routinely causes an announcement to be returned to the caller for conveying dialing instructions and indicating that the dialed number is not a working number.

If the number is active, system 11 examines table 20 and its file 28 for translating the dialed INWATS number and originating area code into a POTS DDD number 919-658-3399 by a look-up operation in table 20. Next, the area code counter 27 is incremented to indicate a call from a station in area code 805. Had the look-up failed to find such a POTS number (null entry) correlated with the originating area code in file 28, the dialed INWATS number would be "out-of-band" to that call originating area. Resultingly, system 11 then effects an incrementing of a counter 27 and a return of an out-of-band CCIS message to toll office 15 of FIG. 1 via the CCIS links 19 and 17 and the signal transfer system 18. Office 15 then routinely effects the transmission of a reorder message to the caller.

System 11 determines that the INWATS call is "in-band" when its lock-up operation extracts a POTS DDD number 919-658-3399 from file 28. That number is then used to locate the file, such as file 23, in table 21 which contains the eight data items needed for further call processing and traffic management. System 11 initially checks file 23 to ascertain whether the station associated with the POTS number is indicated to be open. This is done by examining item 24 of file 23. If the station is open, system 11 next examines the busy/idle data, item 25. If the station is idle, then the POTS number, 919-658-3399 will be returned to office 15 for normal call setup. If the station is closed or busy, then system 11 examines item 26 of file 23 to obtain an alternate POTS number. The loop bit, item 49, is set to prevent looping between POTS numbers. If an alternate POTS number exists, such as 206-582-2044, and its loop bit is not set, then the process continues until either an open and idle station is found, no alternate POTS number is found, or transfer is made to a POTS number whose loop bit is set. The last two situations will cause system 11 to send a CCIS message to office 15, via the CCIS facilities, indicating an ineffective attempt. If the call results in an ineffective attempt and in the process of picking alternate POTS numbers a busy condition is encountered, then the CCIS message includes an indicator telling office 15 to return either a busy tone or audible message to the caller. If all encountered POTS numbers had been closed, then the CCIS message includes an indicator telling office 15 to transmit an audible message to the caller indicating the status of the called station.

Upon finding that the INWATS call is "in-band" and that a station, such as station 22, 30 or 31 associated with a preferred or alternate POTS number is opened and nonbusy, system 11 effects a transmission of a CCIS message including that number to toll office 15 via the CCIS facilities 16. Office 15 then controls the establishment of call connections to the respective station 22, 30 or 31 illustratively, over trunk 33, toll office 34, trunk 35, toll office 36, trunk 37, local office 38, and line 39 to station 22 or from office 34, trunk 40, local office 41, to station 30. Connections to station 31 similarly are extendable from office 36 via trunk 42 and office 43. The called station is then alerted to the incoming call and conversation ensues.

Each file in table 21 is equipped with a network management counter which retains a current count of the number of calls directed to the POTS number. For example, file 32 has the counter 51 for counting calls directed to the number 212-525-3333. The last file examined in the sequence of first choice or alternate POTS numbers increments its current counter item 46. This counter will be reinitialized periodically, for example, every two minutes. After the CCIS message is returned to office 15 with either a POTS number or an ineffective attempt, then item 50 of the last file is checked. This is an indication of whether a control is presently in progress for that POTS number. If the control is on, then the inhibit time, item 48, is returned in another CCIS message to office 15. Office 15 then inhibits all new data base attempts to that 800-NXX-XXXX for the prescribed time period. Calls to this number, arriving at office 15 during such an interval of time, are given an audible message indicating the situation. Periodically, for example every two minutes, all counters, item 46, are compared against this threshold, item 47. The threshold per unit time is set on the basis of the number of lines of the INWATS station, call holding times and similar factors. If the control is currently off and the counter is less than the threshold, then the counter is merely set to zero. If the control is currently off and the counter exceeds the threshold, then the control is turned on, item 50, inhibit time is set to an initial state, for example 6 seconds, and the counter is set to zero. If the control is on and the counter is less than the threshold, the inhibit time is decreased by three seconds, for example, while if the counter is over the threshold the inhibit time is increased by, for example, three seconds. Again the counter is set to zero. If the inhibit time goes to zero, then the control is taken off, item 50.

The result of the network management action is that mass calling attempts that are not likely to be completed are not routed to data base 11 or beyond toll office 15. This frees data base 11, CCIS facilities 17, 18 and 19 and the toll network to serve other calls and reduces the probability of call blockage due to mass calling of an INWATS customer.

Busy data for an INWATS station is written into the data base 11 under control of the terminating office utilizing the CCIS system. Illustratively, such data is gathered for the line(s) of station 22 by the terminating office 38 and busy/idle records for the one or more lines, such as line 39, serving that station. The busy/idle data is sent by CCIS message over CCIS facilities 44 and signal transfer system 45 the response to the appropriate busy or idle condition. When an all lines busy condition exists for station 22, terminating office 38 sends a CCIS message to transfer system 45 which translates it and determines that the busy data is to be routed to data base 11 for entering a busy status "1" in the busy record 25 of the file of table 21 for station 22. Resultingly, INWATS calls designated for routing to that station are blocked and alternate routing is effected as priorly explained. A similar CCIS signaling operation occurs to enter an idle bit "0" in record 25 when station 22 has at least one idle line.

The foregoing method, in addition to being utilized for INWATS service, is useful for automated collect calls, toll call forwarding and other special service calls of a type served for example by a Traffic Service Position System as disclosed in R. J. Jaeger et al U.S. Pat. No. 3,484,560 of Dec. 16, 1969. For the collect call service, the entitled customer is given a single multi-digit number, such as a 700-NXX-XXXX, number or a φ-700-NXX-XXXX+PIN (Personal Identification Number) code where the PIN code is a multidigit security code, which is given to anyone that the customer wishes to give a standing authorization to call him collect. In the data base, the customer telephone number is stored in a first memory table, such as table 20 of FIG. 2 in correlation with the number. When a caller dials the number, the data base receives from the communication system a special service call message including that number and selectively a suffix code, such as an originating area code; verifies the in-band nature of the call plus the security code if supplied; translates the received message into a call completion control message, such as a routing message including the customer telephone station number; and sends the control message to the telephone machine for controlling the establishment of call connections from the calling station to the customer station authorizing the automatic collect calling. Charges are then billed to that customer. Busy/idle and open/closed station data, alternate station routing data, and network management data including call counting such as are stored in the table 21 of FIG. 3, are usable for automated collect calling.

Toll call forwarding is essentially the same as described for INWATS and automated collect calling except that the forwarding is illustratively effected by allowing the called party to change the POTS number in FIG. 2 by contacting, for instance, an operator having access to the CCIS system for sending a message to the data base to update the number.

Reference is made to A. B. Mearns (Case 1) patent application Ser. No. 924,169, filed concurrently herewith.

What is claimed is:

1. A method of deriving call routing information from a data base system for a special service call processed by a communication switching system characterized by
receiving at said data base system from said switching system a special service call message including a code dialed by a caller and augmented by a code identifying the originating area of said call,
translating said message into a call routing message at said data base system, and
transmitting said routing message from said data base system to said switching system.

2. A method of deriving call routing information from a data base system for a special service call processed by a communication switching system characterized by
receiving at said data base system a special service call message from said switching system,
translating said message into a call routing message at said data base system, and
transmitting said routing message from said data base system to said switching system, and further characterized by said call routing message comprising a station number designating a destination station and
checking at said data base system the availability of said station to serve said call during said translating of said special service call message into said routing message.

3. The invention of claim 2 further characterized by controlling the sending of said station number from said data base system to said switching system only when said checking indicates that said station is available to serve said call.

4. The invention of claim 2 further characterized by obtaining at said data base system another station number designating an alternate station to receive said call when said checking indicates that said destination station is unavailable to serve said call, and
sending said other station number from said data base system to said switching system.

5. The invention of claim 1 further characterized by said routing message comprising a station number designating a destination station,
storing at said data base system data signals indicating the busy/idle status of said destination station,
supplying at said data base system another number designating an alternate station to receive said call when the stored data signals indicate that said destination station is busy, and
sending the supplied other number from said data base system to said communication switching system.

6. A method of deriving cell routing information from a data base system for a special service call processed by a communication switching system characterized by
receiving at said data base system a special service call message from said switching system,
translating said message into a call routing message at said data base system, and
transmitting said routing message from said data base system to said switching system, and further characterized by said special service call message comprising a code indicating the area in which said special service call originates, and
accumulating a count at said data base system of each said special service call and in response to a receipt of the said area code therefor.

7. A method of deriving call routing information from a data base system for a special service call processed by a communication switching system characterized by
receiving at said data base system a special service call message from said switching system,
translating said message into a call routing message at said data base system, and
transmitting said routing message from said data base system to said switching system, and further characterized by said routing message comprising a station number designating a destination station, and
counting at said data base system the number of calls attempted to said destination station,
comparing at said data base system the counted number with a prescribed threshold number, and
sending a message from said data base system to said switching system for controlling the subsequent inhibiting of the transmitting of said special service call message from said communication switching system to said data base system for a predetermined time period.

8. A method of deriving call routing information from a data base system for a special service call processed by a communication switching system characterized by
receiving at said data base system a special service call message from said switching system,
translating said message into a call routing message at said data base system, and
transmitting said routing message from said data base system to said switching system, wherein
said special service call comprises an INWATS call,
said special service call message comprises a dialed INWATS number and a code identifying the area in which said INWATS call originates,
said translating at said data base system is characterized by converting said INWATS number and area code into a POTS (Plain Old Telephone Service) DDD (Direct Distance Dialing) number identifying a preferred INWATS station to serve said call.

9. The invention of claim 8 wherein
said converting is characterized by locating an originating area code file of data identified by the INWATS number, examining said file to locate said originating area code, and extracting said POTS DDD number correlated in said file with the located originating area code.

10. The invention of claim 9 wherein said converting is further characterized by locating a POTS file for said POTS DDD number, examining said POTS DDD number file to check the availability of said preferred INWATS station for serving said call, and controlling the sending of said POTS DDD number from said data base system to said communication switching system.

11. The invention of claim 10 wherein said examining of said POTS DDD number file is characterized by checking busy/idle and closed/open data stored in said number file for said INWATS station.

12. The invention of claim 11 wherein said examining of said POTS DDD number file is characterized by extracting another POTS DDD number designating an alternate station for serving said call, locating a POTS file for said other POTS DDD number, and examining said other POTS DDD number file to check the availability of said alternate station to serve said call.

13. The invention of claim 12 wherein said examining of said other POTS DDD number file for said preferred station is characterized by checking busy/idle and closed/open data stored in said other number file for said alternate INWATS station to serve said INWATS call, and then controlling the sending of said other POTS DDD number from said data base system to said communication switching system when said alternate station is checked to be open and idle.

14. A method of deriving call routing information from a data base system for a special service call processed by a communication switching system characterized by receiving at said data base system a special service call message from said switching system, translating said message into a call routing message at said data base system, and transmitting said routing message from said data base system to said switching system, characterized in that said communication switching system is equipped with CCIS (Common Channel Interoffice Signaling) facilities including a signal transfer system for signaling communication with CCIS facilities of said data base system and further characterized by receiving at said switching system a special service code dialed by a caller, generating at said switching system a code identifying the area in which said call originates, transmitting said special service call message including said dialed code and originating area code in CCIS message format to said signal transfer system, and routing said CCIS message from said signal transfer system to said data base system.

15. The invention of claim 14 in which said translating at said data base system is characterized by converting the dialed code and originating area code into said call routing number, and said number sending comprises transmitting a CCIS message including said routing number to said signal transfer system and switching system for controlling the completion of said call connections.

16. The invention of claim 15 in which said converting is characterized by locating a special service code memory identified by said dialed code, examining an area code file of the located memory to determine the entitlement of said caller to said special service, and transmitting a CCIS message from said data base system through said signal transfer system to said communication switching system identifying a nonentitlement of said caller to said special services.

17. The invention of claim 16 in which said examining of said area code file determines the entitlement of said caller to said special services by locating said call routing number therein, said routing number designates a communication station, and said converting further is characterized by checking a routing number file to determine the availability of said station to serve said special service call.

18. The invention of claim 17 in which said file checking is characterized by determining the open/closed status of said communication station, and transmitting a CCIS message from said data base system through said signal transfer system to said communication switching system for specifying that said special service call cannot presently be completed due to a closed status of said station.

19. The invention of claim 17 in which said file checking is characterized by determining the open/closed status of said communication station, and reading from said routing number file another routing number designating an alternate communication station for serving said special service call when said designated communication station is determined to be closed.

20. The invention of claim 19 further characterized by checking a file in said memory for said other routing number to determine the availability of said alternate station to serve said service call, and transmitting a CCIS message including said other routing number from said data base system through said signal transfer system to said switching system to control the establishment of call connections to said available alternate station.

21. The invention of claim 17 in which said converting further is characterized by ascertaining from said routing number file the idle/busy condition of said communication station when said checking determines an open status of said station, and said number sending comprises transmitting said CCIS message including said routing number to said signal transfer system and switching system for controlling the completion of said call connections to said communication station when said station is ascertained to be idle.

22. The invention of claim 21 further characterized by counting at said data base system the number of calls attempted to said communication station,
comparing the counted number with a prescribed threshold number, and
transmitting a CCIS message from said data base system through said signal transfer system to said switching system for controlling the inhibiting said transmitting of the CCIS special service call message to said signal transfer system for a predetermined time period.

23. A method of deriving call routing information from a data base system for a special service call processed by a communication switching system characterized by
receiving at said data base system a special service call message from said switching system,
translating said message into a call routing message at said data base system, and transmitting said routing message from said data base system to said switching system,
characterized in that
said communication switching system is equipped with CCIS (Commom Channel Interoffice Signaling) facilities including a signal transfer system for signaling communication with CCIS facilities of said data base system, and further
characterized by
receiving at said switching system a special service code dialed by a caller,
transmitting said special service call message including said dialed code in CCIS message format to said signal transfer system,
routing said CCIS message from said signal transfer system to said data base system, and
translating the CCIS message received at said data base system into said routing message including a code identifying a destination for said call.

* * * * *

UNITED STATES PATENT AND TRADEMARK OFFICE
CERTIFICATE OF CORRECTION

PATENT NO. : 4,191,860

DATED : March 4, 1980

INVENTOR(S) : Roy P. Weber

It is certified that error appears in the above-identified patent and that said Letters Patent are hereby corrected as shown below:

In the Abstract, line 8, "Signalling" should read --Signaling--. Column 2, line 56, "custmer" should read --customer--. Column 3, line 23, "serivce" should read --service--. Column 5, line 44, "cells" should read --calls--. Column 8, line 12, "serivce" should read --service--. Column 9, line 8, "lock-up" should read --look-up--.
Column 12, line 6, "cell" should read --call--. Column 16, line 5, "Commom" should read --Common--.

Signed and Sealed this

Fifth Day of May 1981

[SEAL]

Attest:

RENE D. TEGTMEYER

Attesting Officer     Acting Commissioner of Patents and Trademarks